United States Patent [19]
Beitel et al.

[11] Patent Number: 5,307,457
[45] Date of Patent: Apr. 26, 1994

[54] TRIGGER FIELD DISPLAY SELECTION

[75] Inventors: Bradley J. Beitel, Woodside; Peter C. Yanker, Portola Valley, both of Calif.

[73] Assignee: International Business Machines Corporation, Armonk, N.Y.

[21] Appl. No.: 8,259

[22] Filed: Jan. 25, 1993

Related U.S. Application Data

[63] Continuation of Ser. No. 367,406, Jun. 16, 1989, abandoned.

[51] Int. Cl.$^5$ .............................................. G06F 15/40
[52] U.S. Cl. ..................................... 395/161; 395/155
[58] Field of Search ............... 395/155, 161, 133, 139; 340/747, 750, 706; 345/127, 141, 118

[56] References Cited

U.S. PATENT DOCUMENTS

| | | | |
|---|---|---|---|
| 4,686,522 | 8/1987 | Hernandez et al. | 340/709 |
| 4,698,625 | 10/1987 | McCaskill et al. | 340/709 |
| 4,757,549 | 7/1988 | Machart et al. | 382/3 |
| 4,772,882 | 9/1988 | Mical | 340/709 |
| 4,899,136 | 2/1990 | Beard et al. | 340/706 |

FOREIGN PATENT DOCUMENTS 0193996  9/1986  European Pat. Off.

OTHER PUBLICATIONS

Wescon Technical Papers, vol. 26, Sep. 1982, pp. 1-4, M. Millier "Table-Driven Approach to Information Storage and Retrieval".

IBM Technical Disclosure, vol. 31, No. 6, Nov. '88, p. 355-360 "Representing bill of Material and Where--Used Product Structure Data Using an Isam Database with two Indices".

IBM Technical Disclosure, vol. 29, No. 10, Mar. '87, p. 4595 "Method for Updating Pointed Records".

Primary Examiner—Phu K. Nguyen
Attorney, Agent, or Firm—Perman & Green

[57] ABSTRACT

An apparatus is described which includes memory areas for storing an image and trigger fields for the image, and a display which indicates a cursor in one of two configurations. Circuitry is provided for moving the cursor and enabling it to implement a select operation for a particular subroutine. The apparatus employs a method which enables the trigger fields to be invisible, which method comprises: displaying the image without trigger fields; and altering the cursor on the display from one configuration to another upon the cursor being moved into an invisible trigger field to thereby indicate to the user the presence of the trigger field.

10 Claims, 3 Drawing Sheets

TRIGGER FIELD DISPLAY SELECTION

This is a continuation of copending application(s) Ser. No. 07/367,406 filed on Jun. 16, 1989 now abandoned.

FIELD OF THE INVENTION

This invention relates to a display driven, data processing system and more particularly, to a method for subroutine selection employing a cursor and invisible trigger fields.

BACKGROUND OF THE INVENTION

It is known that during run-time presentations of display images in a data processing system (e.g. a personal computer), an image zone ("trigger field") can be selected by a user moving a cursor to the field, under control of a mouse or keyboard keys Such trigger fields may correspond to displayed icons, portions of an image, areas around significant words, etc. Depending upon the user's selection of a trigger field, different program paths can be implemented, subroutines activated, or other processing functions controlled. For example, an icon of of a cat may lead to one story path, while an icon of a dog may lead to a different path. To enable this selectivity, the image must have the trigger field identified in advance so that the placement of a cursor therein enables the selection of the particular story path.

Characteristically, trigger fields are marked on the display so that the user knows where to move the cursor to make the selection. Of necessity, the trigger fields are kept relatively small so that the field demarcations do not occupy significant space on the display. This then requires the user to move the cursor, with some precision, to assure that the cursor overlaps the trigger field Cursor "overshoots" and "undershoots" are common and require time consuming adjustment by the user to assure proper cursor/trigger field alignment Thus, for optimum user interaction, it is desirable to make trigger fields as large as possible, but then the image becomes cluttered This results in a larger problem when it is desired to have many trigger fields overlapping various portions of an image. For instance, if an image of an airplane is displayed, and it is desired to enable the user to select any of the main aircraft subassemblies, e.g. wings, tail, fuselage etc., and then display a blow-up image of the selected portion, the placement of visible trigger fields can significantly clutter the image and may obscure structural features.

Accordingly, it is an object of this invention to provide a display with trigger fields which facilitate user selection.

It is another object of this invention to provide a display with trigger fields which do not clutter the image.

SUMMARY OF THE INVENTION

An apparatus is described which includes memory areas for storing an image and trigger fields for the image, and a display which indicates a cursor in one of two configurations Circuitry is provided for moving the cursor and enabling it to implement a select operation for a particular subroutine. The apparatus employs a method which enables the trigger fields to be invisible, which method comprises: displaying the image without trigger fields; and altering the cursor on the display from one configuration to another upon the cursor being moved into an invisible trigger field, to thereby indicate to the user the presence of the trigger field.

DETAILED DESCRIPTION OF THE INVENTION

Figure 1:
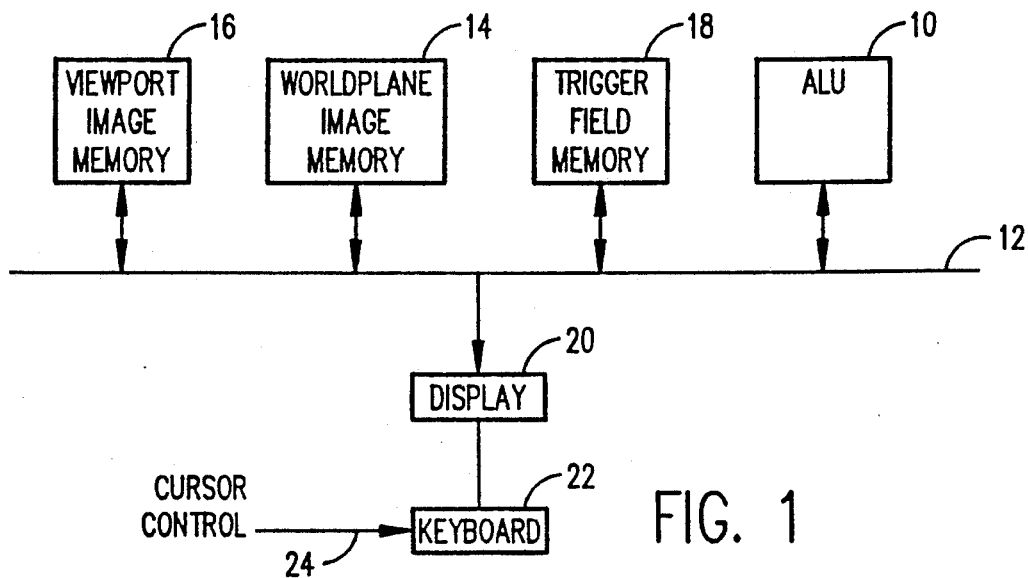
FIG. 1 is a high level block diagram of a display processor adapted to carry out the method of the invention.

Referring now to FIG. 1, a block diagram is shown of portions of a data processing system having display capability. As is known, the processor comprises arithmetic/logic unit 10 coupled to a bus (or buses) 12 to which are also coupled a plurality of memory modules. While the memory modules to be hereinafter described, are shown as independent memories, it is to be understood that they would generally be configured as portions of a larger random access memory rather than as independent modules.

World plane image memory 14 contains the storage for pixels of a pre-determined size image. Viewport image memory 16 contains sufficient pixel storage for a single screen on a display. Trigger field memory 18 is a memory area which provides storage for user-defined trigger fields which are overlayed on world plane image memory 14. Also connected to bus 12 is a display 20 with a keyboard 22. A cursor control input 24 to keyboard 22 may be provided from a mouse or other known cursor control implement. In addition, keyboard 22 is provided with cursor control direction keys which also enable the movement of the cursor on display 20.

The operation of the system shown in FIG. 1 is conventional in that arithmetic logic unit 10 provides to world plane image memory 14, an image from a scanner or other input device (not shown). A portion of the world plane image in memory 14 is then fed to viewport image memory 16 and then to display 20, for user viewing World plane image memory 14 contains an image which is larger (e.g., 1024 by 1024 pixels) than can be shown on a pixel per pixel basis on display 20. Thus, viewport image memory 16 is provided with the exact number of pixels which can be displayed in one screen (e.g., 640 by 480 pixels).

Figure 2:
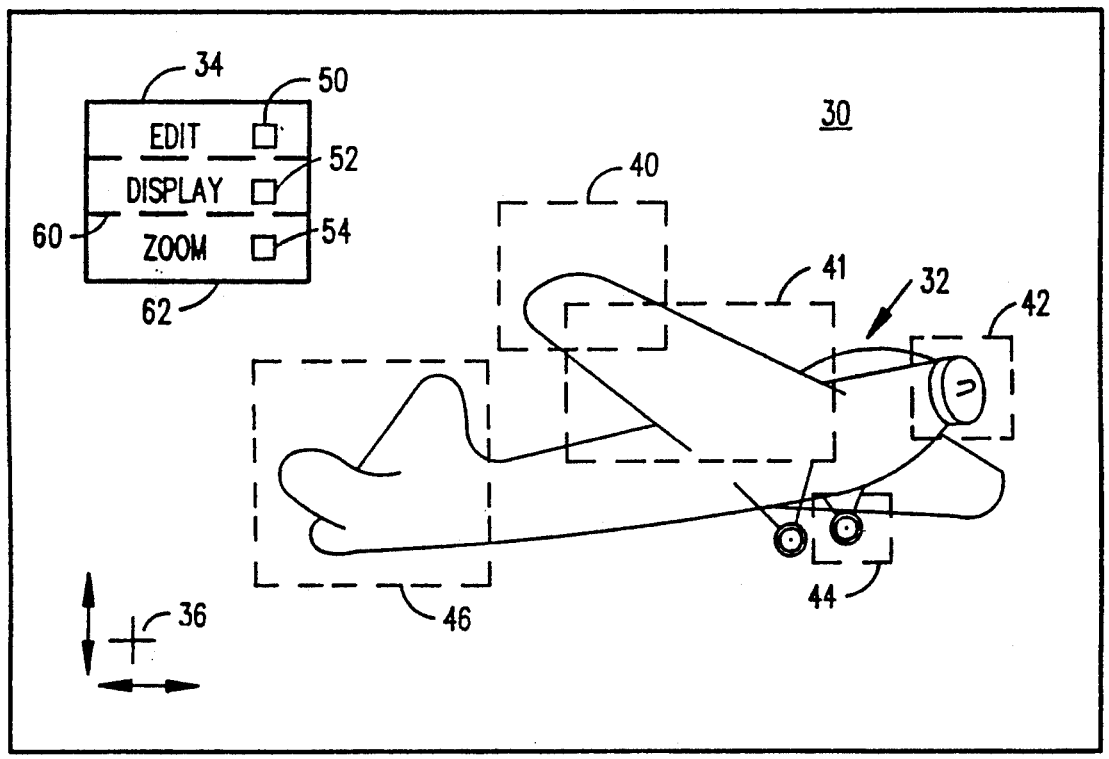
FIG. 2 is an example of a display screen showing the placement of images and trigger fields.

An exemplary screen to be displayed on display 20 is shown in FIG. 2. Screen 30 contains a view of an airplane 32 which is in turn, provided with wings, fuselage, landing gear etc. A window 34 is shown at the upper left of screen 30 and contains three selectable subroutines. The "edit" routine may be selected to alter the showing of one or more portions of airplane 32. The "display" routine may cause a particular selected portion of the airplane to be displayed individually on the screen. The "zoom" routine enables a particular feature of the airplane to be enlarged for viewing.

A cursor 36 is movable on screen 30 in either the horizontal or vertical direction. A plurality of trigger fields 38, 40, 41, 42 and 44 are shown encompassing various portions of airplane 32. The placement of cursor 36 within the boundaries of any of the aforementioned trigger fields and a user's subsequent actuation of an appropriate keyboard key, will cause the actuation of a particular subroutine related to the trigger field in accordance with the routine chosen by the user in pull down window 34. For instance, if the user actuates pull down 34, and positions a cursor within any of boxes 50, 52 or 54, the associated subroutine is then enabled to be performed upon a selected portion of airplane 32 which is encompassed by the chosen trigger field. The subsequent placement of cursor 36 within a selected trigger field, and its selection, causes that portion of the airplane to be acted upon, as determined by the user selected routine from pull-down 34.

It should be noted that irregularly shaped trigger fields can be created by overlapping them as shown by trigger fields 40 and 41. In such a case, ascribing the same name to both fields enables the selection of either one to access the subroutines for both.

Prior art systems have required that cursor 36 be placed within boxes 50, 52 and/or 54 to enable the selection of one or more of the indicated functions. In addition, trigger fields 38, 40, 42, etc. have been required to be shown on the face of the display to enable the user to know where to position cursor 36 to enable selection of the particular portion of the airframe, upon which the function is to be carried out.

Figure 3:
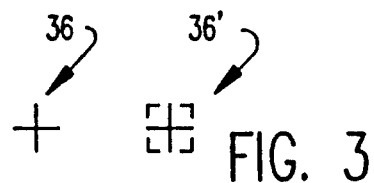
FIG. 3 is an example of two cursor configurations used with the invention.

Referring now to FIG. 3, two forms of cursor 36 are shown. Cursor 36 is a cross which is movable across the face of screen 30 by a directional cursor control. Cursor 36' is a second configuration of cursor 36 which is automatically displayed when cursor 36 is placed within a trigger field. As will be hereinafter understood, during the operation of the this invention, none of trigger fields 38, 40, 42 and 44 are shown on screen 30. In addition, in lieu of employing trigger boxes 50, 52 and 54, the areas encompassing the edit, display and zoom function indications can be employed as trigger fields For instance, the area beneath line 60 and above line 62 can be used as the trigger field for the zoom function.

Figure 4:
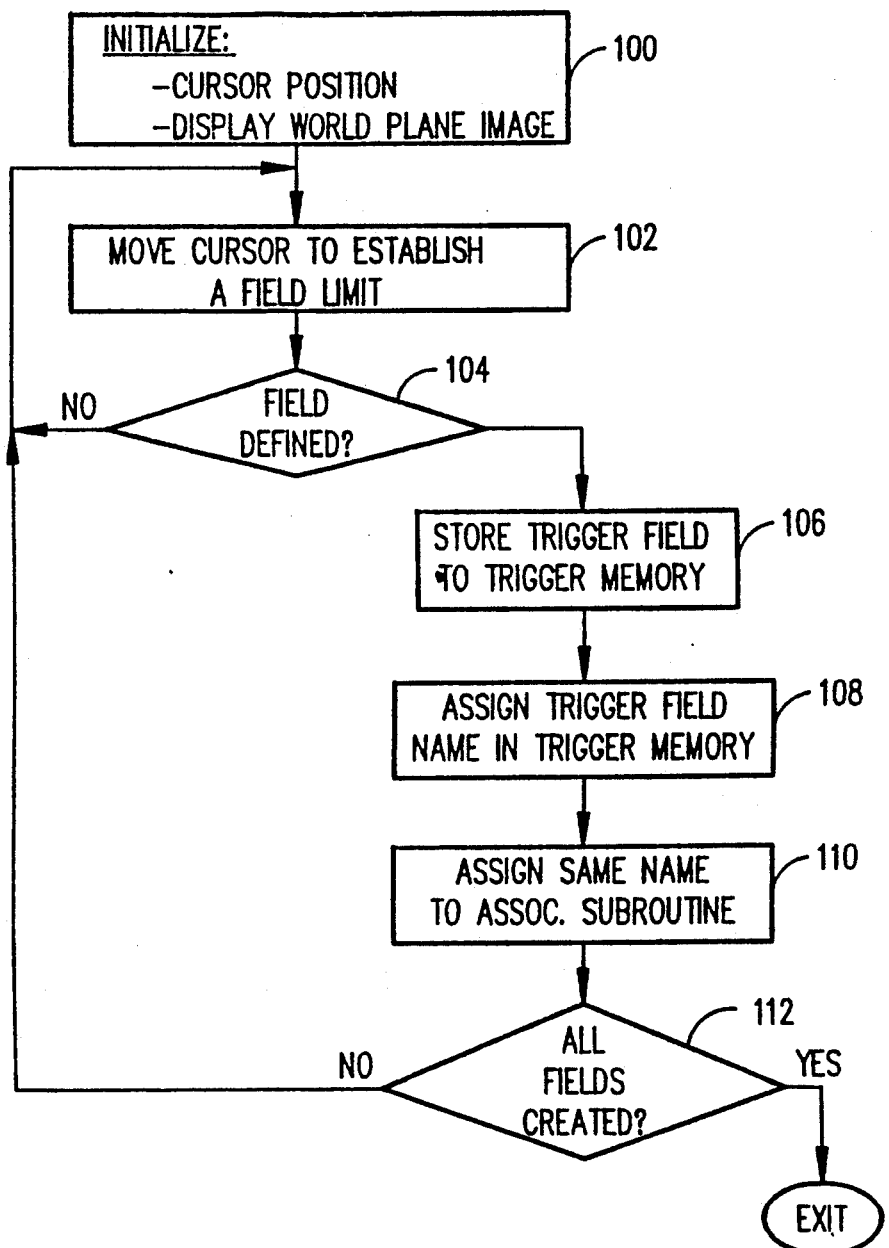
FIG. 4 is a high level flow diagram illustrating the process for creating an invisible trigger field on a display image.

Referring to FIG. 4, the method for inserting various trigger fields is described. The trigger field "edit" operation commences by ALU 10 causing display 20 to display a world plane image, as well as initializing the position of cursor 36 on screen 30 (box 100). The user then views screen 30 and the displayed world plane image and decides where trigger fields are to be established. To establish a first trigger field, the user positions cursor 36 at a corner of a desired trigger field and draws a line to another point to establish a limit of the trigger field (box 102). As is known, this action is shown on screen 30 by a line, which line may be differentiated from other world plane image lines by either making it a different color, making it dotted, etc.

If at the termination of the creation of a field limit, there is no user key entry that a full trigger field has been established, then the program recycles to enable other field limits to be inserted decision box 104. If, on the other hand, a user key entry is sensed indicating that the field has been defined, the thus created trigger field is stored to trigger field memory 18 (box 106). A name is then assigned to the stored trigger field and is noted in trigger field memory 18 (box 108). Similarly, the same name is assigned to an associated subroutine which will be enabled when the specific trigger field is selected (box 110). The selection of a trigger field subsequently occurs as the result of a user positioning cursor 36 within its limits and actuating a "select" or "enter" key on keyboard 22.

Once all trigger fields have been created (decision box 112), the routine exits with all of the field limits stored in trigger field memory 18. If more fields remain to be created, the program recycles to enable their creation The displayed world plane image with trigger fields overlayed is then returned to a separate storage area for later viewing, if desired. The original world plane image still remains in world plane image memory 14 without the trigger fields indicated thereon.

Figure 5:
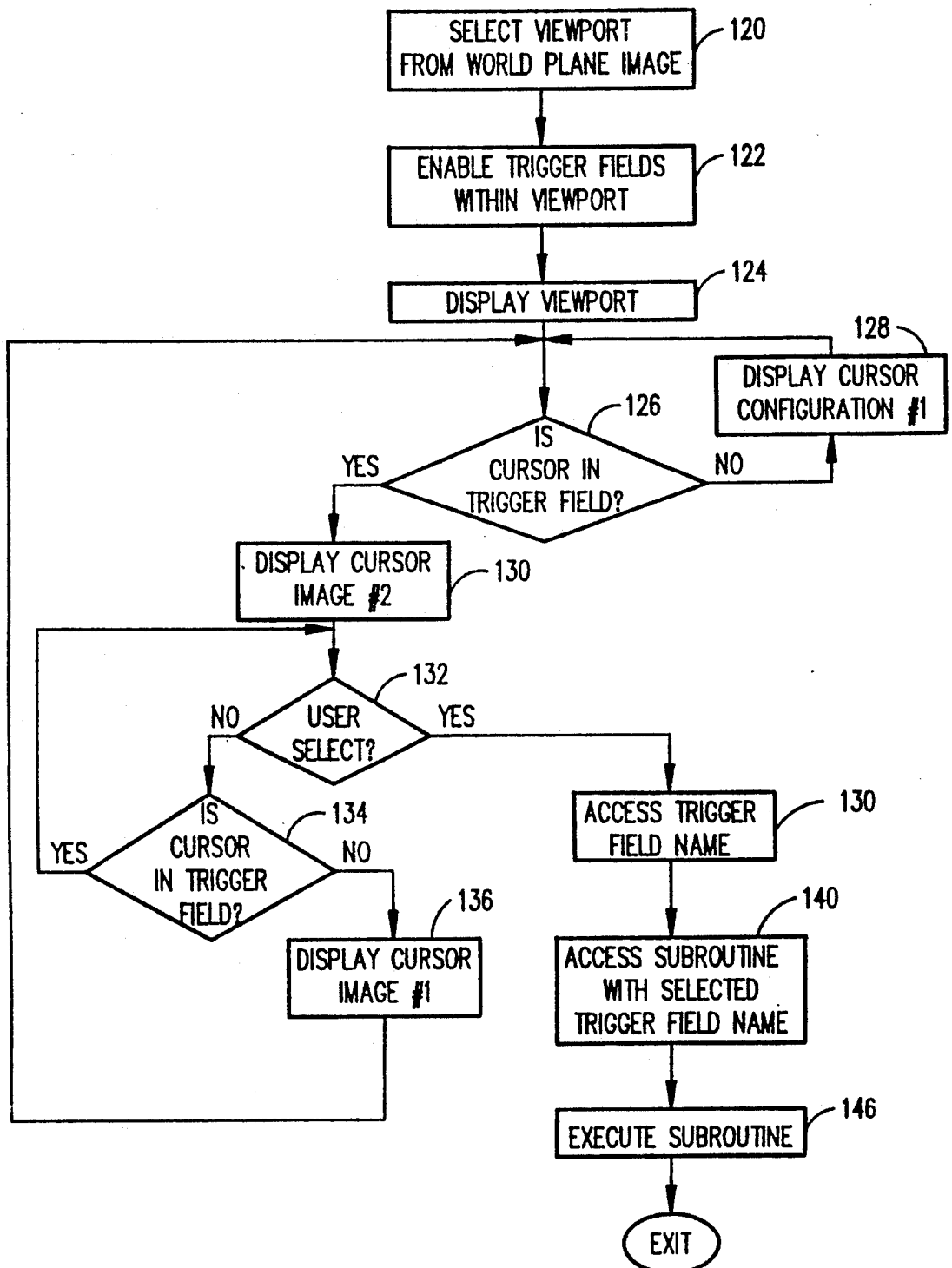
FIG. 5 is a high level flow diagram illustrating the operation of the invention.

Turning now to FIG. 5, the operation of the system, in combination with invisible trigger fields, will be described. Initially, the user selects a viewport from the world plane image stored in world plane image memory 14. The viewport may be all of the world plane image or just a portion thereof (box 120). Depending upon the selected viewport, the trigger fields stored within trigger field memory 18 are tested to determine if they fall within the confines of the selected viewport. If so, they are enabled for subsequent interrogation (box 122).

The system then displays the viewport with no trigger fields indicated (box 124). At the same time a cursor is also displayed and, immediately, a determination is made as to whether the cursor is or is not within a trigger field (box 126). If it is found not to be within a trigger field, a cursor configuration, such as shown at in FIG. 3, is displayed (box 128). If the cursor is found to be within a trigger field, a cursor image, such as is shown in FIG. 3 at 36', is displayed (box 130). If the first cursor configuration (36) is displayed, the user understands that no trigger field select operation is possible and the user may then continue to move the cursor about the display screen. If the second cursor configuration (36') is evidenced on the screen, the user may, if desired, select the particular trigger field in which the cursor is positioned (box 132). If the user does not indicate a selection of that trigger field, the position of the cursor is subsequently again tested (box 134) to determine if it still remains within the trigger field. If it is found to be still within the specific trigger field, the program recycles to determine if the user has selected the field. If the cursor is found to have moved out of the trigger field, the cursor display is then changed back to the first configuration (i.e. FIG. 3 — cursor 36) and the program recycles as shown in FIG. 5 (box 136).

If the user actuates a select key (box 132) while the second cursor configuration is showing, the name of the trigger field in which the cursor is positioned is accessed (box 138), and the subroutine with the identical name is also accessed and brought into action (boxes 140, 142).

ALU 10, in determining whether the cursor is positioned over a trigger field, notes the position of the cursor and compares it with each of the enabled trigger fields stored within trigger field memory 18. It is the outcome of that comparison which enables the cursor image to either be displayed as cursor 36 or cursor 36'. It can thus be seen that the user is enabled by a simple change of cursor configuration, to identify the presence of invisible trigger fields and to actuate a subroutine associated therewith.

It should be understood that the foregoing description is only illustrative of the invention. Various alternatives and modifications can be devised by those skilled in the art without departing from the invention. Accordingly, the present invention is intended to embrace all such alternatives, modifications and variations which fall within the scope of the appended claims.

We claim:

1. In an apparatus including storage means for storing an image and a trigger field, a display screen means for indicating a cursor, said trigger field comprising data defining a geometric pattern that is user-positionable to define an area on said display screen means, said geometric pattern placeable at any arbitrary location on said display screen means independent of image placement, means to alter said cursor between at least two configurations, and means for moving said cursor, a method for enabling a user to identify an invisible trigger field, comprising the steps of:

(a) positioning plural trigger fields at locations on said display screen, said locations user-choosable independent of whether or not said image or a portion of said image is present at said locations;
    (b) inhibiting display of said plural trigger fields;
    (c) displaying said image;
    (d) moving said cursor about said display screen means to bring said cursor into first locations of said display screen means where said image is displayed and into second locations of said display screen means substantially removed from where said image is displayed; and
    (e) altering said cursor on said display means from one said configuration to another said configuration upon said cursor being moved into a said non-displayed trigger field, to thereby indicate to the user the presence of the trigger field in either a said first location or a second second location of said display screen means.

2. The method of claim 1 further including the step of:

(d) enabling a select operation upon the occurrence of a change of cursor configuration as recited in step (c).

3. The method of claim 2 further including the step of:

(e) altering a software path upon a user's actuation of the select operation recited in step (d).

4. In a display apparatus including a cursor, the method comprising:

(a) creating a world plane that contains an image;
    (b) positioning trigger fields at any arbitrary position in said world plane independent of image placement, said position user-choosable independently of whether or not said contained image or any portion thereof is present at a said position;
    (c) storing said world plane, contained image and trigger fields positioned in said world plane;
    (d) displaying said contained image but not said trigger fields; and
    (e) moving said cursor about said display apparatus to bring said cursor into first areas of said display apparatus where said image is displayed and into second areas of said display apparatus removed from where said image is displayed; and
    (f) visually indicting when said cursor is moved into a trigger field by a change in configuration of said cursor on said display apparatus, said change in configuration indicating a presence of said trigger field.

5. The method of claim 4 wherein said method comprises the added step of:

(g) enabling a subroutine associated with said trigger field, only when said cursor has changed into a configuration indicating its presence in a trigger field.

6. A display apparatus comprising:

memory for storing an image and at least a trigger field, said trigger field comprising data defining a geometric pattern that is user-positionable at any arbitrary location on said display screen means whether or not said image is present at said location;

a display for displaying a cursor and said image;

cursor placement means for enabling movement of said cursor on said display both at locations displaying said image and at locations distant from said displayed image; and arithmetic logic means for inhibiting display of said associated trigger field on said display and solely responsive to cursor placement means positioning of said cursor in a said non-displayed trigger field positioned at any said arbitrary location on said display, to indicate the presence of said non-displayed trigger field to a user by a change in cursor manifestation.

7. The apparatus as recited in claim 6, wherein said arithmetic logic unit causes said cursor to manifest a first display configuration that is altered to a second display configuration when said cursor placement means positions said cursor in a non-displayed trigger field.

8. The apparatus of claim 6 wherein said arithmetic logic means enables a select operation upon the occurrence of a change of said cursor configuration.

9. The apparatus of claim 8 wherein said arithmetic logic means alters a software path upon a user's actuation of the select operation through said keyboard means.

10. The apparatus of claim 9, wherein said associated trigger field contains a label and said arithmetic logic means causes a software routine to be selected that contains said same label.

* * * * *